United States Patent
Pohle

(10) Patent No.: US 9,959,231 B2
(45) Date of Patent: May 1, 2018

(54) DATA BUS COUPLER AND METHOD OF OPERATION

(71) Applicant: SIEMENS AKTIENGESELLSCHAFT, Munich (DE)

(72) Inventor: Michael Pohle, Chemnitz (DE)

(73) Assignee: Siemens Aktiengesellschaft, Munich (DE)

( * ) Notice: Subject to any disclaimer, the term of this patent is extended or adjusted under 35 U.S.C. 154(b) by 148 days.

(21) Appl. No.: 15/070,647

(22) Filed: Mar. 15, 2016

(65) Prior Publication Data

US 2016/0275029 A1   Sep. 22, 2016

(30) Foreign Application Priority Data

Mar. 17, 2015 (EP) .................................... 15159428

(51) Int. Cl.
| | |
|---|---|
| *G06F 13/00* | (2006.01) |
| *G06F 13/362* | (2006.01) |
| *G05B 19/042* | (2006.01) |
| *G06F 13/40* | (2006.01) |

(52) U.S. Cl.
CPC ......... *G06F 13/362* (2013.01); *G05B 19/042* (2013.01); *G06F 13/4022* (2013.01)

(58) Field of Classification Search
CPC .. G06F 13/362; G06F 13/4022; G05B 19/042
See application file for complete search history.

(56) References Cited

U.S. PATENT DOCUMENTS

| | | | | |
|---|---|---|---|---|
| 8,786,127 | B2 * | 7/2014 | Volkmann | G05B 19/0425 307/1 |
| 2003/0236937 | A1 * | 12/2003 | Barros De Almeida | H04L 12/5692 710/305 |
| 2004/0199352 | A1 * | 10/2004 | Kojima | H04L 1/244 702/111 |
| 2009/0119437 | A1 * | 5/2009 | Hilscher | H04L 12/407 710/305 |
| 2009/0287318 | A1 * | 11/2009 | Reidt | H04L 12/403 700/3 |
| 2009/0299503 | A1 * | 12/2009 | Oster | H04L 12/423 700/81 |
| 2010/0026369 | A1 * | 2/2010 | Hofmayer | G01D 3/08 327/379 |
| 2012/0023277 | A1 | 1/2012 | Graf et al. | |

FOREIGN PATENT DOCUMENTS

| | | | |
|---|---|---|---|
| DE | 102 06 657 A1 | 9/2003 | |
| DE | 102006026972 | * 10/2007 | ....... H04L 12/40006 |
| EP | 2 765 465 A1 | 8/2014 | |
| EP | 2765465 A1 | * 8/2014 | ......... G05B 19/0423 |

* cited by examiner

*Primary Examiner* — Jing-Yih Shyu
(74) *Attorney, Agent, or Firm* — Cozen O'Connor

(57) ABSTRACT

A data bus coupler has a primary bus connection for a primary bus and a plurality of secondary bus connections each for a terminal. The coupler includes a slave unit connected to the primary bus connection and a master unit connectable to the secondary bus connections and configured for sending telegrams to and receiving telegrams from the secondary bus connections, and a control unit. Communication switching means, under control of the control unit, connect each secondary bus connection to/from the master unit.

9 Claims, 1 Drawing Sheet

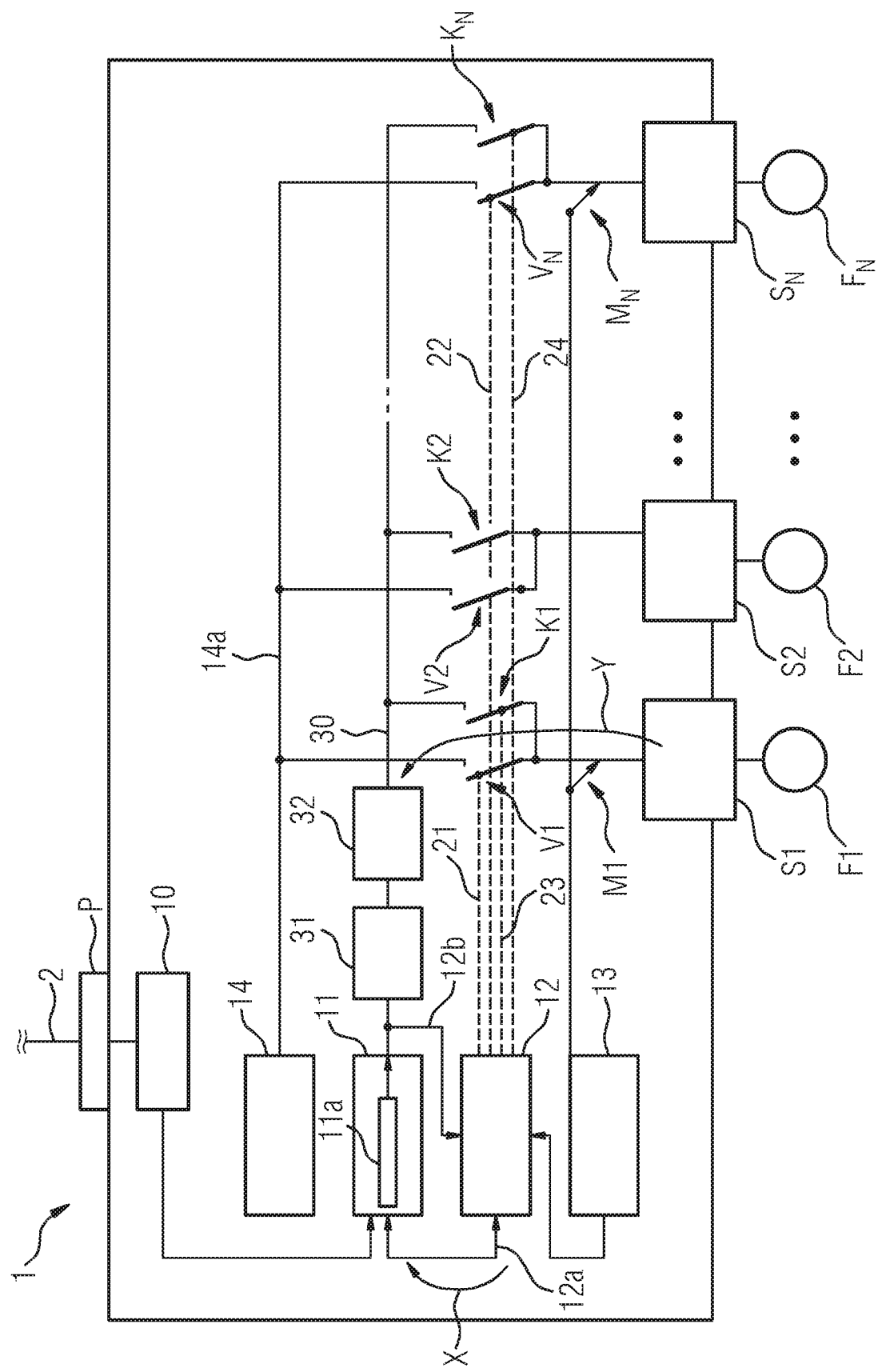

DATA BUS COUPLER AND METHOD OF OPERATION

BACKGROUND OF THE INVENTION

1. Field of the Invention

The invention relates to a data bus coupler having a primary bus connection for a primary bus and a plurality of secondary bus connections each for connection of a terminal, and that includes a slave unit connected to the primary bus connection and a master unit connectable to the secondary bus connections and which is operable for sending telegrams to the secondary bus connections.

2. Description of the Related Art

In the context of data bus couplers such as that of the present invention, the primary bus and the links of the second bus connections to the terminals can be regarded as fieldbuses. When employing such fieldbuses, for example instance in automation technology such as a Profibus PA or a Foundation fieldbus H1 (an FF H1), if two or more terminals with an identical bus address are disposed on the data bus coupler, a system failure can occur, the cause of which can be difficult to determine. An exchange or the adding of terminals is also complicated, since allocation of subscriber addresses requires additional operating steps and the use of a programming device.

The publication EP 2 407 840 A1 discloses a method for operating an automation device which includes at least one master unit and at least one slave unit/DP-FF link connected by a first bus. Telegrams are transferred during control of a technical process by way of the first bus; these telegrams include a process image data area for configured field devices that are connected to the slave unit by a second bus/FF bus and have a configured, reserved process image data area.

The disadvantage with known methods is that a manual bus address setting of the field devices must take place outside of the system before they are then integrated into the system. The field devices must be connected and manually sequentially commissioned. In the commissioning, a bus address allocation, as with a portable programming device, is carried out, with each field device must be parameterized differently from all other field devices, one after the other.

SUMMARY OF THE INVENTION

It is accordingly an object of the present invention to provide for rapid, simple and conflict-free commissioning of field devices or terminals, such as Profibus PA or Foundation fieldbus-H1 field devices, on a data bus coupler.

In a data bus coupler having a primary bus connection for a primary bus and a plurality of secondary bus connections for the connection of each terminal, wherein the data bus coupler has a slave unit connected to the primary bus connection and a master unit for connection to the secondary bus connections, and which is operable for sending telegrams to the secondary bus connections, the data bus coupler additionally includes in accordance with the invention one control unit and one communication switching means for each secondary bus connection. The communication switching means is implemented to connect or separate each respective secondary bus connection to or from the master unit under the control of the control unit. The control unit is configured to include a command output and is operable to inform a determinable secondary bus connection by way of the command output of the master unit of a planned query of the control unit, and to further include a telegram evaluation input that is connected to the master unit. The control unit is operable to read the telegrams sent by the master unit and to examine the telegrams at the planned query. The control unit is further operable to control the communication switching means at the point in time that the query is sent by the master unit. Inasmuch as the control unit, in controlling the communication switching means of the associated secondary bus connections, is thus operable to enable a specific secondary bus connection, as for an address query, for connection to the master unit, interference from other subscribers is avoided because the remaining secondary bus connections are correspondingly disconnected by the associated communication switching means from the master unit. This featured isolation when sending is to occur can also be briefly relaxed, as may be needed or desired, before, during or after the sending operation.

In a further advanced embodiment of the inventive data bus coupler, in respect of defined address checks or address queries from individual terminals connected to the secondary bus connections, the control unit may also advantageously be configured to that the communication switching means associated with a queried secondary bus connection is controlled to connect the associated secondary bus connection identified in the query to the master unit and to control the remaining communication switching means for separating or disconnecting the master unit from the other secondary bus connections not identified in the query.

The inventive data bus coupler may also advantageously include, for each secondary bus connection, a supply switching means, the control unit being further configured to control the supply switching means for individually connecting a supply voltage to the secondary bus connections.

The data bus coupler may advantageously further include a diagnostics unit connected to the control unit and operable to identify a connection of a terminal to a secondary bus connection, the control unit being configured to control all of the supply switching means, prior to a possible identification, to connect the supply voltage to the secondary bus connections.

If a subscriber is separated from the data bus coupler, for example for a change in configuration during its operation (CiR, Configuration Change in Run), this separation is registered by the diagnostics unit. The diagnostics unit then informs the control unit, which cuts off the associated communication switching means of the secondary bus connection, from which the terminal was separated, from the master unit in order to avoid additional interference.

If on the other hand a terminal is connected to a secondary bus, the diagnostics unit will register this based on additional energy consumption, and the diagnostics unit will in turn inform the control unit by way of the additionally connected subscriber. The additionally connected terminal is now supplied with a supply voltage but, based on its control by the control unit, the communication switching means of the additionally connected terminal will still not connect the additionally connected terminal to the master unit to thereby avoid communication interference. This additionally added terminal will also be checked during a next scan by the data bus coupler, wherein all communication switching means are sequentially controlled to check each subscriber for a valid address and, if necessary, to allocate a suitable address so that the subscriber can then be included in the normal communication operation. The data bus coupler thus allows for replacement or adding of terminals, since exchanged or added terminals need only be connected and are then automatically identified by the data bus coupler in a scan run and then assigned their bus addresses in a conflict-free manner.

To this end, the diagnostics unit can also advantageously be configured to identify a separation of a terminal from a secondary bus terminal, the control unit being operable to control the associated communication switching means almost simultaneously such that the master unit is separated from the associated secondary bus connections. The diagnostics unit identifies a separation using, for example, a wire-break check.

Rapid, simple and conflict-free commissioning of, e.g. Profibus PA or Foundation fieldbus-H1 field devices on a data bus coupler, is likewise achieved by a method for determining the addresses of terminals. Where terminals are connected via a secondary bus connection to a data bus coupler, wherein based on a terminal connected to a secondary bus connection in the control unit a query for this terminal is generated, the query is transferred to the master unit and is placed in a queue. At the same time, the telegram traffic emitted by the master unit is monitored by the control unit and the sent telegrams are checked for appearance of the query. The query is directed at a determined secondary bus connection and contains a first suspected address of the terminal connected to the determined secondary bus connection. The monitoring causes the query to be emitted by the master unit so that the control unit controls the communication switching means such that the determined secondary bus connection is or remains connected to the master unit and the remaining secondary bus connections are separated from the master unit. The connection or separation of the secondary bus connections to/from the master unit is particularly advantageous because by disconnecting the currently unaddressed secondary bus connections, neither the remaining telegram traffic nor the other terminals are disturbed because an address query is now directed only at a wholly determined subscriber. Placing the query in the queue allows these address queries to take place during normal operation of the data bus coupler. The normal telegram traffic still continues to run as the query is sent by the control unit, since the query is now placed into the queue and the control unit registers that the query is now in sequence. After processing of the normal communication telegrams, the communication switching means is controlled as the query is emitted by the master unit, so that the query can only reach the subscriber intended to be queried. By so implementing this functionality, address queries can occur in a conflict-free manner during running operations of the data bus coupler.

Since the address queries are to be automatically handled in the data bus coupler, it is advantageous if in a first query attempt the query is directed at a first secondary bus connection or at the first terminal connected thereto and the query contains an address with the value according to an importance based on the position of the secondary bus connection or the terminal on the data bus coupler. A response sent by the first terminal is awaited and in the event that no response is received by the master unit within a predetermined time span, a second query attempt is performed with an address based on a default value. If a response is received by the master unit within the predetermined time span, the address contained in the last query is assumed to be valid for this secondary bus connection or the connected subscriber. This procedure lends itself in particular to initial commissioning of a fieldbus system with a data bus coupler having a number of fieldbus trains and several terminals.

An address query is thus sent to a terminal with a suggested address. Ideally, the first terminal has the address 1, the second terminal the address 2, the third terminal the address 3, and so on. It may however also be that the terminal has a default address, as for example 126. Since this latter situation, especially for an initial commissioning, is frequently the case, the query in the second query attempt is executed with the suggested default address of the default value. If the query with the default address is however also not successful, the entire address range from zero to 125 is checked successively.

In a further step of the method, if the query results in the subscriber not having an address corresponding to the importance of the position of the secondary bus connection but, instead, an address obtained from a successive check, an address allocation command is allocated according to the manner of sending the query.

If no address query is positively acknowledged, a diagnosis—which checks whether a device is actually connected or whether it is defective or whether it is not suitable for the bus—is generated.

In the aforedescribed steps of the inventive method, the accesses of further bus subscribers connected by way of the primary bus to, for example, the remaining secondary bus connections during the query period are preferably suppressed by the master unit.

One contemplated variant of sending the query is as follows: the control unit preferably sends a diagnosis command (GetDiag), which contains the suggested address as a contact person for the diagnosis. If the subscriber connected to the determined secondary bus connection does not react to the diagnosis command in a predetermined time, the suggested address is set to the default value of (for example) 126 in a next query; if this query too is not positively acknowledged, then for the subsequent query the suggested address is incremented by 1 with each such query, as from 0 to 125, until there is a positive response to the diagnosis command for an address.

With all specific queries on an individual subscriber, it is advantageous if after transmitting the query to the master unit and after a waiting time has elapsed, the communication switching means is controlled by the control unit so that the remaining secondary bus connections are again connected to the master unit to insure their continued normal communication operation.

To fully implement in the data bus coupler the automated process for the determination of terminal addresses, when a response is received by the master unit within the predetermined time span, a query is generated by the control unit for a further secondary bus connection or for a further terminal connection, to thereby check all possibly connected terminals for their addresses.

These and other objects and features of the present invention will become apparent from the following detailed description considered in connection with the accompanying drawing. It is to be understood, however, that the drawing is designed solely for purposes of illustration and not as a definition of the limits of the invention, for which reference should be made to the appended claims.

BRIEF DESCRIPTION OF THE DRAWINGS

In the drawings:
The single FIGURE is diagrammatic schematic of a data bus coupler in accordance with the invention.

DETAILED DESCRIPTION OF THE PRESENTLY PREFERRED EMBODIMENTS

In the FIGURE, a data bus coupler 1 includes a primary bus connection P for connection to a primary bus 2 and a plurality of secondary bus connections S1, S2, ... $S_N$ for connection of a plurality of terminals F1, F2, ... $F_N$.

The data bus coupler 1 can be employed by way of example in automation technology as a data bus coupler 1 between a superior Profibus DP bus and a subordinate Profibus PA bus.

For communication between the superior bus and the subordinate bus, data bus coupler 1 has a slave unit 10 which is connected to the primary bus connection P, and a master unit 11 which can be connected to the secondary bus connections S1, S2, ... $S_N$ and which is operable for sending telegrams to the secondary bus connections S1, S2, ... $S_N$.

The slave unit 10 is connected to master unit 11 by a data line and can as a result forward telegrams from primary bus 2 to master unit 11. Master unit 11 is in turn connected to a segment coupler 31, which is in turn connected to a converter 32. Downstream of converter 32 is an internal bus line 30 of data bus coupler 1. Each of the secondary bus connections S1, S2, ... $S_N$ is connected to internal bus line 30 by a corresponding communication switching means K1, K2, ... $K_N$. The first secondary bus connection S1 can thus be connected to the internal bus line 30 by a first communication switching means K1, the second secondary bus connection S2 can be connected to internal bus line 30 by a second communication switching means K2, and an n-th bus connection of bus connection $S_N$ can be connected to internal bus line 30 by an $n^{th}$ communication switching means $K_N$.

Terminals F1, F2, ..., $F_N$ are connected to the secondary bus connections S1, S2, ..., $S_N$ by corresponding fieldbus branches.

To control the communication switching means K1, K2, ... $K_N$, the data bus coupler 1 includes a control unit 12. Control unit 12 controls each of the communication switching means K1, K2, ... $K_N$ such that the respective secondary bus connection S1, S2, ... $S_N$ is connected to or separated from the master unit 11.

For controlling the communication switching means K1, K2, ... $K_N$ with respect to the connection or separation, control unit 12 has a command output 12a and is configured to notify a determinable secondary bus connection S1, S2, ... $S_N$ of a planned query X of control unit 12 by way of the command output 12a of master unit 11. Control unit 12 also has a telegram evaluation input 12b that is connected to master unit 11 and is configured to read the telegrams sent by master unit 11 and to examine the telegrams for the planned query X; control unit 12 is further implemented to suitably control the communication switching means K1, K2, ... $K_N$ at the point in time of sending of the query X by master unit 11.

Since it is the desideratum of the invention that a user generally no longer need worry about bus address allocation when commissioning (for example) Profibus PA or Foundation fieldbus H1 fieldbus segments, a bus address allocation or a check of bus addresses or a recognition of newly added devices is effected fully automatically and in a conflict-free manner by data bus coupler 1. To assure that this can take place both during initial commissioning as well as during ongoing operations, the control unit 12 is configured to control the communication switching means K1, K2, ... $K_N$ associated with the queried secondary bus connection S1, S2, ... $S_N$ to connect the associated secondary bus connection S1, S2, ... $S_N$ identified in the query X to master unit 11 and to control the remaining communication switching means K1, K2, ... $K_N$ to separate master unit 11 from the secondary bus connections S1, S2, ... $S_N$ not identified in query X.

To connect and disconnect a supply voltage 14 to/from terminals F1, F2, ... $F_N$, the data bus coupler 1 internally includes a single supply line 14a. A supply voltage can be separately connected to each of the secondary bus connections S1, S2, ... $S_N$ by corresponding supply switching means V1, V2, ... $V_N$. Control unit 12 is also configured to suitably control the supply switching means V1, V2, ... $V_N$.

With the control of the supply switching means V1, V2, ... $V_N$, prior to querying a determined secondary bus connection S1, S2, ... $S_N$. the respective supply voltage is supplied to the secondary bus connection S1, S2, ..., $S_N$ to be queried so that a supply voltage 14 is fed to a terminal F1, F2, ... $F_N$ that may be connected to the secondary bus connection S1, S2, ... $S_N$.

For control of supply switching means V1, V2, ... $V_N$ and control of communication switching means K1, K2, ... $K_N$, the control unit 12 includes a first control line 21, a second control line 22, a third control line 23 and a fourth control line 24; for clarity, however, only the first control line 21 for controlling first supply switching means V1 and the second control line 22 for controlling the n-th supply switching means $V_N$ are shown. Similarly, only the third control line 23 and fourth control line 24 for controlling the first and the $n^{th}$ communication switching means K1 and $K_N$ are shown.

For a diagnosis, data bus coupler 1 has a diagnostics unit 13 which is connected to control unit 12 and is configured to identify a connection of a terminal F1, F2, ... $F_N$ to a secondary bus connection S1, S2, ... $S_N$. Control unit 12 is also configured to control all of the supply switching means V1, V2, ... $V_N$ prior to a possible identification, such that the supply voltage 14 is connected to the secondary bus connections S1, S2, ... $S_N$. The diagnostics unit 13 is configured to identify a separation of a terminal F1, F2, ... $F_N$ from a secondary bus connection S1, S2, ... $S_N$, the control unit 12 being configured to control the associated communication switching means K1, K2, ... $K_N$ almost simultaneously so that master unit 11 is separated from the associated secondary bus connections S1, S2, ... $S_N$.

To implement the diagnosis, the secondary bus connections S1, S2, ... $S_N$ have measuring points M1, M2, ... $M_N$.

In accordance with the inventive method, the data bus coupler 1 is operated as follows, based on a terminal F1 connected to a secondary bus connection S1, S2, ... $S_N$. A query X for this terminal is generated in control unit 12, and the query X is transferred to master unit 11 and placed in a queue 11a. Simultaneously, the telegram traffic transmitted by master unit 11 is monitored by control unit 12 and the sent telegrams are checked for appearance of the query X, the query X being directed at a determined secondary bus connection S1 and containing a first suggested address of the terminal F1 connected to secondary bus connection S1. If this monitoring identifies that the query X sent from master unit 11 to secondary bus connection S1 or first terminal F1 connected thereto is next on the internal bus line 30, control unit 12 controls first communication switching means K1 so that first secondary bus connection S1 is connected to master unit 11 and the remaining secondary bus connections S2, ... $S_N$ are separated from master unit 11.

A preferred control of the communication switching means provides that all of the communication switching means K1, ... $K_N$ are connected to master unit 11 and, if during a transmission of a telegram it is identified that it is the query X, the communication switching means K2, ..., $K_N$ are separated from the master unit and communication switching means K1 remains connected.

For instance, it is only after the first 2-bytes of a telegram have been transmitted that it is identified that it involves query X and the communication switching means $K_1, \ldots, K_N$ were thus switched off. However, 2-bytes have now already been transferred to the terminals $F_2, \ldots F_N$ and the connection starts in the middle of the transmission. The terminals $F_2, \ldots F_N$ accordingly do not contain the entire telegram or the query X and reject the partly received telegram as invalid. This ensures that unaffected terminals $F_2, \ldots F_N$ do not contain the telegram or the query X.

In a first query attempt, the query X is initially directed at the first secondary bus connection S1 or at the first terminal F1 connected thereto. The query X contains an address with a value according to an importance, which the secondary bus connection S1 or the first terminal F1 has based on its position on data bus coupler 1. The first address is thus populated with the importance value 1. A response Y from the first terminal F1 is now awaited and, in the event that no response Y from first terminal F1 is received by master unit 11 within a predetermined time interval, a second query attempt is performed with an address according to the value of a default value (e.g., 126).

After unsuccessful querying with the default value 126, further query attempts are made sequentially using the entire value range of possible addresses, as a function of the presence or use of the PROFIBUS PA or FF.

If a response Y of the first terminal F1 is received by master unit 11 within the predetermined time interval, the address contained in the preceding query X is assumed to be valid for this secondary bus connection S1 or for the first subscriber F1 connected thereto.

If on the other hand no response Y is received for all of the queries X previously performed, then a fault message is output.

The data bus coupler 1 is accordingly configured to perform the following functions:

1. Continuous Operation:

The master unit 11 attempts during its regular communication operations to reach all terminals which were projected, even if these are not currently reachable.

2. Configuration Changes During Operation (CiR):

Functions of Reliable Switching-On.

In this method step, it is important that all accesses to further bus subscribers connected via the primary bus, as on the remaining secondary bus connections $S_2, \ldots S_N$, are preferably suppressed by master unit 11. Control unit 12 controls all of the supply switching means $V_1, 2, \ldots V_N$ in the state of switching on the supply voltage 14 and separating all communication switching means $K_1, K_2, \ldots K_N$. If a terminal $F_1, F_2, \ldots F_N$ is now connected to data bus coupler 1, this is detected by diagnostics unit 13 because (for example) electricity consumption can be measured. Control unit 12 is informed of the switching-on of the terminal by diagnostics unit 13. During this time, other terminals with possible communication queries or telegrams in respect of address parameters or settings may not prove to be troublesome, since their communication switching means $K_1, K_2, \ldots, K_N$ are still always opened.

3. Configuration Changes During Operation (CiR):

Fail-Safe Separation of Terminals.

If a terminal F1 is separated or detached from a secondary bus connection S1, this is also detected by diagnostics unit 13, for example using a wire-break or continuity check. Control unit 12 is notified of this notification, as a result of which control unit 12 will immediately control the corresponding communication switching means K1 so that the internal bus line 30 is no longer connected to the secondary bus connection S1. Even with this functionality, accesses by connected further bus subscribers to the remaining secondary bus connections $S_1, \ldots S_N$ are again suppressed.

4. Configuration Changes During Operation (CiR):

Address Determination of a Terminal.

Control unit 12 controls the communication switching means such that only that communication switching means of the secondary bus connection to be checked is closed. The control unit 12 sends a GetDiag command in the following sequence:

a) address according to a suggested site of installation,
b) default value,
c) all remaining addresses 0 to 125.

Control unit 12 examines all telegrams which are sent by master unit 11. If a telegram does not correspond to the query X (GetDiag command), or if the corresponding communication switching means is still opened but the telegram corresponds to the query X (GetDiag command), which is expected, then all other communication switching means are opened except for the communication switching means for the terminal to be addressed. If the GetDiag command with its telegram is at the end, all communication switching means are again reset. If a response appears for the GetDiag command, the assigned address of the terminal is thus known and the method step can be stopped or can even be continued in order to track whether more than one terminal is connected to this secondary bus connection.

5. Configurations During Operation (CiR):

Address Allocation of a Terminal.

If the previously detected address of the terminal corresponds for example to the importance of the position on the data bus coupler, then no further method steps are required and associated communication switching means remains closed. On the other hand, control unit 12 will send a set slave address to the corresponding terminal, by means of which the address of the terminal is changed.

6. Normal Operation:

All connected terminals are found in a data exchange mode. The supply switching means are all closed. The communication switching means for the secondary bus connections, to which a terminal is connected, are closed, the remaining communication switching means are opened. Here the control unit 12 is still only in a monitoring mode and still responds only to diagnostics unit 13. Control unit 12 now no longer influences master unit 11.

The following advantages result, in utilizing the present invention, for a commissioning engineer of an automation solution. The commissioning engineer generally need no longer be concerned about the process of bus address allocation when commissioning Profibus PA or Foundation fieldbus H1 fieldbus segments. Bus address allocation is performed completely automatically and in a conflict-free manner using the data bus coupler of the invention.

Moreover, in terminal replacement or the adding of terminals, the terminals need only be added or connected and they are then automatically identified by the data bus coupler and provided with a new bus address in a conflict-free automated process.

Still further, during commissioning a significant time savings is advantageously achieved and the sources of and likelihood of possible errors are reduced, particularly in commissioning of Profibus PA and Foundation fieldbus H1 fieldbus segments.

While there have been shown and described and pointed out fundamental novel features of the invention as applied to preferred embodiments thereof, it will be understood that various omissions and substitutions and changes in the form and details of the methods described and devices described and illustrated, and in their operation, may be made by those skilled in the art without departing from the spirit of the invention. It is the intention, therefore, to be limited only as indicated by the scope of the claims appended hereto.

I claim:

1. A data bus coupler having a primary bus connection for connection to a primary bus and a plurality of secondary bus connections each for connection to a respective terminal, said data bus coupler comprising:
   a slave unit connected to the primary bus connection;
   a master unit connectable to the secondary bus connections and configured to send telegrams to and receive telegrams from the secondary bus connections;
   a control unit; and
   a plurality of communication switching means each operatively connecting a respective one of the secondary bus connections to the master unit;
   wherein the control unit is configured to control the plural communication switching means to selectively connect and disconnect each secondary bus connection from the master unit;
   wherein the control unit further comprises:
      a command output, the control unit being configured for informing to inform the master unit, via the command output, of a planned query of a particular one of the secondary bus connections; and
      a telegram evaluation input connected to the master unit, the control unit being further configured to read the telegrams sent by the master unit and to examine the telegrams for the planned query, and to control, when the planned query is sent by the master unit, the plural communication switching means; and
   wherein the control unit is further configured to control a communication switching means associated with the queried particular secondary bus connection to connect the particular secondary bus connection determined to the master unit and to control others of the communication switching means to disconnect the master unit from the respective secondary bus connections.

2. The data bus coupler of claim 1, further comprising:
   a supply switching means for each of the secondary bus connections;
   wherein the control unit is further configured to control the supply switching means to for selectively connect a supply voltage to each of the secondary bus connections.

3. The data bus coupler of claim 2, further comprising:
   a diagnostics unit that is connected to the control unit and configured to identify a connection of one of the terminals to one of the secondary bus connections;
   wherein the control unit is configured to control the supply switching means, prior to said identification, to connect the supply voltage to the secondary bus connections.

4. The data bus coupler of claim 3, wherein the diagnostics unit is further configured to identify a disconnection of one of the terminals from one of the secondary bus connections; and
   wherein the control unit is configured to control for controlling the respective communication switching means substantially simultaneously with the identification of disconnection to disconnect the master unit from the one secondary bus connection.

5. A method for determining addresses of terminals connected to a data bus coupler as claimed in claim 1 via secondary bus connections, the method comprising:
   for a one of the terminals that is connected to a respective secondary bus connection, generating in the control unit a query for the one terminal;
   transferring the generated query to the master unit and placing the query in a queue of the master unit; and
   concurrent with said transferring, monitoring by the control unit telegram traffic transmitted by the master unit and checking by the control unit the monitored telegram traffic for an appearance of the query;
   wherein the generated query is directed at a determined one of the secondary bus connections and the generated query includes a first suggested address of the one terminal connected to the determined one of the secondary bus connections;
   wherein said monitoring causes the query to be transmitted by the master unit; and
   wherein the control unit controls the communication switching means to connect the determined secondary bus connection to the master unit and to disconnect from the master unit the secondary bus connections other than the determined secondary bus connection.

6. The method of claim 5, wherein in a first query attempt the query is directed at one of a first secondary bus connection or at a first one of the terminals connected to the first secondary bus connection;
   wherein the query contains an address with an importance-based value in accord with a position of the first secondary bus connection or the one terminal on the data bus coupler, the method further comprising:
      awaiting by the master unit a response sent by the one terminal in response to the first query attempt and
      if no response to the first query attempt is received by the master unit within a predetermined time span, a second query attempt is sent with an address having a default value, and
      if a response to the first query attempt is received by the master unit within the predetermined time span, the address contained in the query of the first query attempt is assumed to be valid for the first secondary bus connection or the one terminal.

7. The method of claim 6, wherein if no response is obtained for all query attempts, a diagnostics command is generated by the control unit and is sent in accord with the sending of the query.

8. The method of claim 7, wherein after transmitting the query to the master unit and after the predetermined time span has elapsed, the communication switching means is controlled by the control unit to reconnect the other secondary bus connections to the master unit.

9. The method as claimed in claim 6, wherein if a response is received by the master unit within the predetermined time span, a query for one of a further secondary bus connection and a further terminal connected to the further secondary bus connection is generated by the control unit.

* * * * *